United States Patent [19]

Monaghan et al.

[11] Patent Number: 4,676,040

[45] Date of Patent: Jun. 30, 1987

[54] STRUCTURAL SUPPORT AND THIN PANEL ASSEMBLY

[75] Inventors: William A. Monaghan; James M. Shook, both of San Jose, Calif.

[73] Assignee: Tandem Computers Incorporated, Cupertino, Calif.

[21] Appl. No.: 914,102

[22] Filed: Oct. 1, 1986

Related U.S. Application Data

[62] Division of Ser. No. 689,395, Jan. 7, 1985, Pat. No. 4,650,263.

[51] Int. Cl.[4] .............................................. E04B 1/38
[52] U.S. Cl. ........................................ 52/285; 52/509; 52/741; 312/263; 403/381
[58] Field of Search ................. 52/285, 286, 509, 512, 52/741; 312/263; 403/252, 247, 381

[56] References Cited

U.S. PATENT DOCUMENTS

| | | | |
|---|---|---|---|
| Re. 30,154 | 11/1979 | Jarvis | 403/248 |
| 509,364 | 11/1893 | Coffeen, Jr. | 403/381 |
| 635,766 | 10/1899 | Gillet | 403/290 |
| 684,663 | 10/1901 | Anawalt | 403/248 |
| 1,294,236 | 2/1919 | Climenson | 403/248 |
| 1,376,150 | 4/1921 | Miller | 403/230 |
| 2,227,326 | 6/1938 | Shaw | 403/230 |
| 2,716,565 | 12/1948 | Harper et al. | 403/289 |
| 3,159,440 | 12/1964 | Courtwright | 312/263 |
| 3,330,084 | 7/1967 | Russell | 52/286 |
| 3,498,655 | 3/1970 | Arms et al. | 52/285 |
| 3,511,525 | 5/1970 | Friedling et al. | 403/247 |
| 3,670,899 | 6/1972 | Kronenberg et al. | |
| 3,747,885 | 7/1973 | Ciancimino | 312/263 |
| 3,747,965 | 7/1973 | Wing | 403/252 |
| 3,837,754 | 9/1974 | Malcik | 403/247 |
| 3,955,510 | 5/1976 | Kinik et al. | 52/285 |
| 4,012,090 | 3/1977 | Pfeifer et al. | 52/285 |
| 4,125,338 | 11/1978 | Lew | 403/381 |
| 4,161,977 | 7/1979 | Baslow | 403/231 |
| 4,261,148 | 4/1981 | Scott | 52/285 |
| 4,357,119 | 11/1982 | Pollitt | 403/231 |
| 4,391,077 | 7/1983 | Giess | 52/285 |
| 4,437,280 | 3/1984 | Collier | 52/285 |
| 4,468,067 | 8/1984 | Jenkins | 312/263 X |

FOREIGN PATENT DOCUMENTS

| | | | |
|---|---|---|---|
| 966405 | 3/1950 | France | 108/153 |
| 1237400 | 6/1971 | United Kingdom | 403/231 |

*Primary Examiner*—J. Karl Bell
*Attorney, Agent, or Firm*—Townsend and Townsend

[57] ABSTRACT

A structural support and thin panel assembly wherein the longitudinal axis of the structural support is attached perpendicular to the thin panel comprising a structural member, a thin panel, a female member attached to the structural member and a fastening means removably attaching the female member to the thin panel.

2 Claims, 7 Drawing Figures

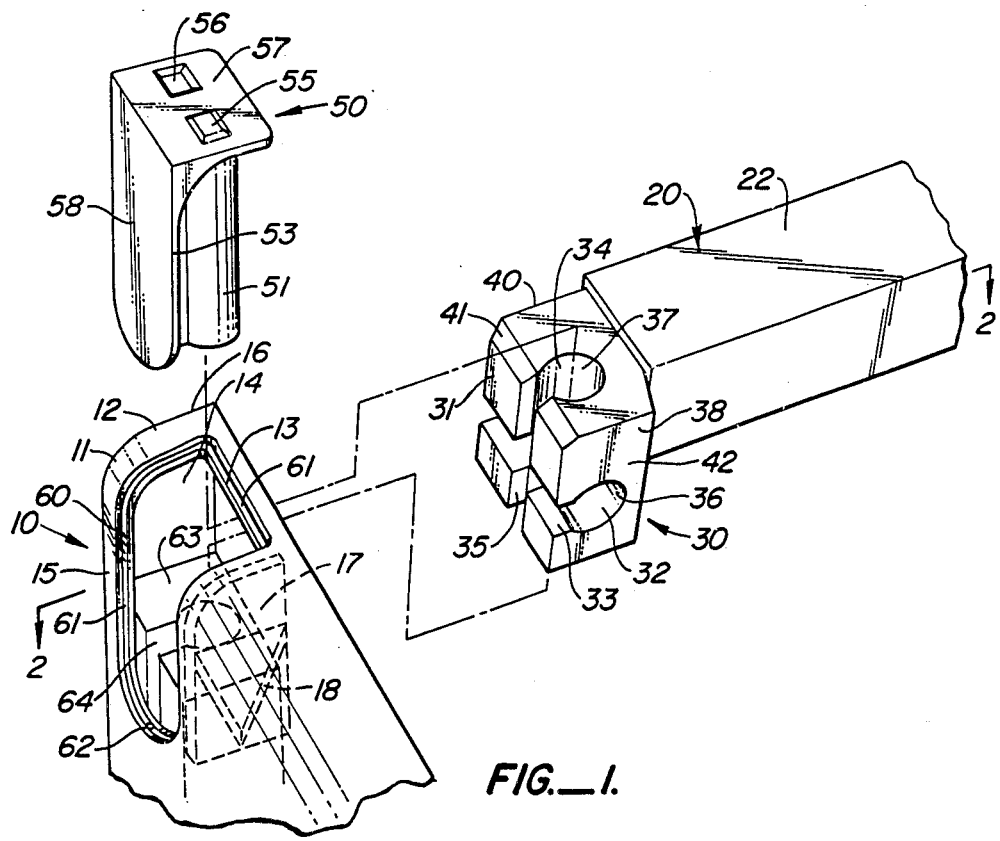
FIG._1.
FIG._2.

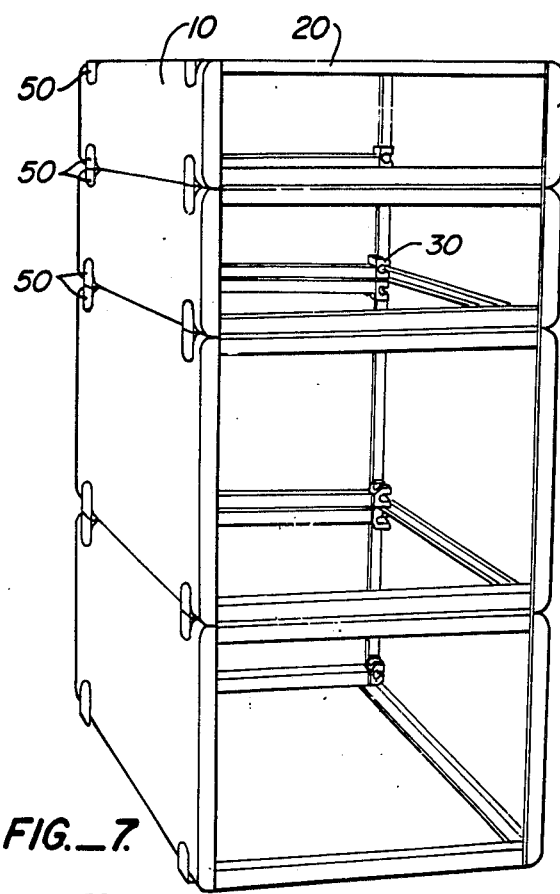
FIG._7.
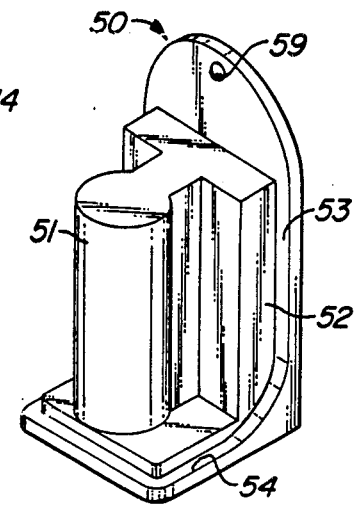
FIG._4.
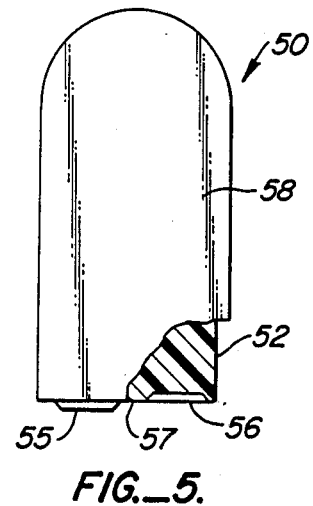
FIG._5.
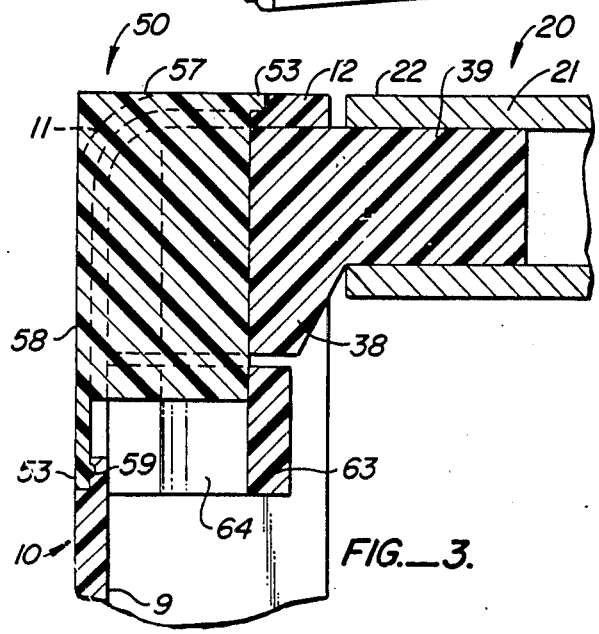
FIG._3.
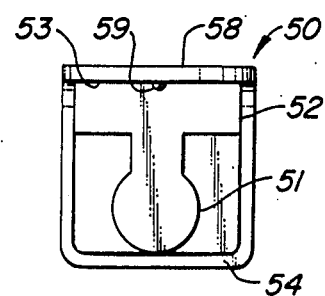
FIG._6.

STRUCTURAL SUPPORT AND THIN PANEL ASSEMBLY

This is a Division of application Ser. No. 689,395 filed Jan. 7, 1985 now U.S. Pat. No. 4,650,263.

BACKGROUND OF THE INVENTION

The present invention is in the field of structural support and thin panel assemblies joining a structural support and a thin panel without the need for tools; more specifically, an assembly in which a structural support is removably attached to a thin panel such that the longitudinal axis of the structural support is perpendicular to the thin panel after attachment and the attachment is accomplished without the use of tools.

One industry in which there is a need for structural support and thin panel assemblies joining a structural member to a thin panel is the electronics industry. One common method for accomplishing this consists of preparing a self supporting welded frame and subsequently, by the use of bolts, screws or snap rivets, attaching thin panels to the frame. Another common method consists of using numerous individual support members which must be assembled, usually with bolts, to form a bolted frame and subsequently attaching the side panels to the previously assembled frame as in the welded frame method. For certain applications these methods are undesirable.

The use of the welded frame structure generally results in the need to fabricate the frame at the manufacturing plant resulting in increased shipping costs. If instead the frame is fabricated at the installation site, there is a need to move tools and equipment to that site in order to fabricate the frame. The use of the bolted frame helps keep shipping costs low but still requires tools and takes a substantial amount of time and manpower to assemble.

SUMMARY OF THE INVENTION

The present invention pertains to structural support and thin panel assemblies wherein a structural member is attached perpendicular to a thin panel, which assembled parts are capable of being formed into a cabinet.

The structural support and thin panel assembly of the present invention is comprised of a structural member, a thin panel, a female member attached to the structural member and a fastening means for removably attaching the female member to the thin panel without the need to use tools. The fastening means is comprised of a slot extending inwardly from an edge of the thin panel and a lock capable of engaging the female member and the slot.

The female member has at least one groove which is perpendicular to the longitudinal axis of the structural member when the female member is attached to the structural member. The groove is shaped such that the opening along the top of the female member is narrower than the base of the groove. The lock is comprised of a male portion having a cross-section substantially the same as the cross-section of the groove so that it can be easily inserted into the groove, a step portion slightly smaller in width than the slot, and a flange portion wider than the slot such that the thin panel can be locked into place between the female member and the lock when the fastener assembly is assembled.

By using eight structural support and thin panel fastener assemblies a sturdy cabinet can be assembled.

Thus, four structural members, employed as horizontal supports and two thin panels, employed as vertical supports, having four slots each, eight female members and eight locks can be easily assembled into a sturdy electronics component cabinet. The entire cabinet being assembled quickly with a minimum of manpower and without the aid of tools.

Accordingly it is an object of the present invention to provide a structural support and thin panel assembly in which a structural member is attached perpendicularly to a thin panel quickly and without the need for tools such that a sturdy cabinet can be easily assembled with a minimum of pieces. Other and further objects and advantages will become obvious hereinafter.

BRIEF DESCRIPTION OF THE DRAWINGS

FIG. 1 is an exploded perspective view of the structural support and thin panel assembly.

FIG. 2 os a cross section taken along plane 2—2 of FIG. 1.

FIG. 3 is a cross section taken along plane 3—3 of FIG. 2.

FIG. 4 is a perspective view of the lock.

FIG. 5 is a back view of the lock.

FIG. 6 is an end view of the lock.

FIG. 7 is a perspective view of four cabinets assembled and stacked using the structural support and thin panel assembly.

DETAILED DESCRIPTION OF THE PREFERRED EMBODIMENT

FIG. 1 is an exploded view of the preferred embodiment of the present invention. The female member 30 is attached to a structural member which in the preferred embodiment is a structural tube 20 having a square cross-section. The female member is removably attached to a thin panel 10 by a fastening means, comprised of a lock 50 and a slot 60.

The female member 30 has a top 31 and at least one groove. A first groove 32 has an opening 33 along the top 31 that has a narrowed width in that the width of the opening 33 is narrower than the width of at least one other section of the first groove 32. The preferred embodiment comprises a second groove 34 which also has an opening 35 which has a narrowed width along the top 31. The cross section of the first and second grooves 32 and 34 can take any geometric shape so long as the openings 33 and 35 have a width narrower than the width of at least one other section of the first and second grooves 32 and 34. The first and second grooves 32 and 34 of the preferred embodiment have a cross section that has walls that are cylindrical at the bottoms 36 and 37 and the openings 33 and 35 have a smaller width than the diameter of the cylindrical bottoms 36 and 37.

The first groove 32 and the second groove 34 are formed in the female member 30 such that when the female member 30 is attached to the structural tube 20 the first and second grooves 32 and 34 are perpendicular to the longitudinal axis of the structural tube 20. Furthermore, the second groove 34 is perpendicular to and intersects the first groove 32 in the same plane as the first groove 32 and intersects the first groove 32 at the center of the top 31.

The female member 30 is also comprised of an upper section 38 and a lower section 39. The upper section 38 is rectanguloid in shape and has a larger cross section than the structural tube 20. The lower section 39 has the same cross section as the structural tube 20 and is such that the lower section 39 can be press fit into the structural tube 20. The upper section 38 and the lower section 39 are formed such that they share only one common corner 40.

For ease of assembly and to compensate for the rounded edge 11, the upper section 38 has a chamfer 41 along two edges of the top 31.

The slot 60 is formed in the thin panel 10 such that it extends inwardly from and perpendicular to an edge of the thin panel 10. In the preferred embodiment a first side 12 is attached perpendicular to the underside 9 of the thin panel 10 at an edge 11. Although the side 12 is shown formed from the thin panel 10 creating a rounded edge 11, such a configuration is not necessary. The side 12 has a cut-out 13 formed in it that is aligned with the slot 60 such that the center line of the slot 60 coincides with the centerline of the cut-out 13. A second side 14 is attached perpendicular to the underside 9 of the thin panel 10 at a second edge 15 adjacent the edge 11 such that a corner 16 is formed. The centerline of the slot 60 is spaced away from the second side 14 a distance equal to one-half the width of the upper section 38 such that the centerline of the second groove 34 is in alignment with the centerline of the slot 60. The width of the slot 60 is smaller than the width of the upper section 38.

The lock 50 is comprised of a male portion 51 which has substantially the same cross section as the first and second grooves 32 and 34 such that the male portion 51 engages one of the grooves when the female member 30 is attached to the thin panel 10. The lock 50 also comprises a step portion 52 having a width slightly smaller than the width of the slot 60 and a flange portion 53 having a width greater than the width of the slot 60.

The lock 50 of the preferred embodiment comprises a stop 54 attached to one end. The width of the stop 54 is greater than the width of the cut-out 13 such that when the lock 50 is inserted into the slot 60 through the cut-out 13 the stop 54 abuts the side 12. A raised piece 55 and an indented piece 56 are formed into a flat face 57 of the stop 54. The raised piece 55 and the indented piece 56 are positioned symmetrically on the flat face 57 such that when a first flat face abuts a second flat face the raised piece of the first flat face fits into the indented piece of the second flat face. The slot 60 and the cut-out 13 are both formed with a ledge 61 such that when the lock 50 is inserted through the cut-out 13 into the slot 60 and the female member 30 the flat face 57 is flush with the surface of the side 12 and the back 58 of the lock 50 is flush with the surface of the thin panel 10.

A protrusion 59 is formed in the flange portion 53 and an indentation 62 is formed in the ledge 61 such that when the lock 50 is inserted in the slot 60 the protrusion 59 snaps into the indentation 60 keeping the lock 50 from sliding out of the slot 60.

A support block 63 having a channel 64 which has the same cross section as the first groove 32 is attached to the underside 9 of the thin panel 10 such that the male portion 51 extends through the female member 30 and into the channel 64 when the female member 30 is attached to the thin panel 10.

For ease in alignment during assembly a guide 17 is attached to the underside 9 of the thin panel 10. The guide 17 is attached parallel to the second side 14 and abuts face 42 of the upper portion 38 when the female member 30 is attached to the thin panel 10. A support 18 is utilized to provide strength to the guide 17.

The structural member 20 has walls 21 with outer surfaces 22. The walls 21 are of the same thickness as the side 12 and the second side 14 such that when the female member is attached to the thin panel 10 the outer surfaces 22 are flush with the surfaces of the sides 12 and 14. Because of the unique configuration of the female member 30, it can be attached at any corner of the thin panel 10 and the outer surfaces 22 will be flush the sides of the thin panel.

A sturdy cabinet capable of holding computer equipment can be assembled using the present invention by press fitting the lower section 39 of the female member 30 into one end of a structural tube 20 and the lower section 39 of another female member 30 into the other end of the structural tube 20; repeating the above steps three times, to end up with four structural tubes 20 with a female member 30 press fit into each end of the structural tubes; abutting the top 31 of one of the female members 30 against the underside 9 of the thin panel 10 at one of the corners formed by a side 12 and a second side 14; inserting a lock 50 through the cut-out 13, into a slot 60 and through one of the grooves until the protrusion 59 snaps into the indentation 62; and, repeating the above steps 8 times.

To form additional cabinets so they may be stacked one on top of the other, as shown in FIG. 6, the above steps should be repeated for each cabinet. When the cabinets are stacked the raised piece 55 of a first lock and the indented piece 56 of a second lock interengage to prevent one cabinet from sliding with respect to another.

While embodiments and applications of this invention have been shown and described, as would be apparent to those skilled in the art, many more modifications are possible without departing from the inventive concepts described herein. The invention therefore should not be restricted except in the spirit of the appended claims.

What is claimed is:

1. A method for fastening a structural member perpendicular to a thin panel to form an instrument cabinet which method comprises the steps of:
    a. press fitting the lower section of a female member which comprises a lower section and an upper section, the upper section having a top and two intersecting grooves with openings with narrowed widths which intersect at the center of the top into one end of a structural tube such that the grooves are perpendicular to the longitudinal axis of the structural tube;
    b. inserting the lower section of a female member identical to the female member of the first step into the other end of the structural tube of the first step such that the grooves are perpendicular to the longitudinal axis of the structural tube;
    c. repeating steps a and b three additional times;
    d. abutting the top of one of said female members against the underside of a thin panel having four sides at one of the corners of the thin panel;
    e. inserting a lock comprising a male portion with a cross section that matches the cross section of the grooves in the female member, a step portion, a flange portion and a stop attached to one end, through a cut-out in the side of the thin panel, into a slot in the thin panel having a width smaller than the width of the flange portion of the lock and slightly larger than the width of the step portion, and into one of the grooves; and,
    f. repeating steps d and e seven times.

2. A method of claim 1 further comprising the steps of:
   g. repeating steps a through h four times; and
   h. stacking the finished cabinets one on top of the other such that a protruding piece and an indented piece in the stops of the lock interengage preventing one instrument cabinet from sliding with respect to another.

* * * * *